United States Patent [19]

Gonzalez-Oliver

[11] Patent Number: 5,063,003
[45] Date of Patent: Nov. 5, 1991

[54] METHOD FOR MANUFACTURING AMORPHOUS SILICA OBJECTS

[75] Inventor: Carlos Gonzalez-Oliver, Backnang-Waldrems, Fed. Rep. of Germany

[73] Assignee: Battelle Memorial Institute, Geneva, Switzerland

[21] Appl. No.: 436,890

[22] Filed: Nov. 15, 1989

[30] Foreign Application Priority Data

Nov. 15, 1988 [EP] European Pat. Off. ........ 88810782.8

[51] Int. Cl.⁵ .......................... B29B 9/00; C01B 33/12
[52] U.S. Cl. ........................................ 264/14; 264/63; 423/335
[58] Field of Search ................... 264/5, 56, 63, 12, 14; 501/12, 133; 423/335, 338, 342

[56] References Cited

U.S. PATENT DOCUMENTS

| | | |
|---|---|---|
| 3,535,890 | 10/1970 | Hansen . |
| 4,243,422 | 1/1981 | Lenz . |
| 4,317,668 | 3/1982 | Susa et al. ............................ 65/29 |
| 4,775,520 | 10/1988 | Unger et al. ....................... 423/335 |
| 4,806,328 | 2/1989 | van Lierop et al. ................ 423/338 |
| 4,842,837 | 6/1989 | Shimizu et al. .................... 423/335 |

*Primary Examiner*—James Lowe
*Assistant Examiner*—Christopher A. Fiorilla
*Attorney, Agent, or Firm*—Cushman, Darby & Cushman

[57] ABSTRACT

The method involves prehydrolysing alkoxysilanes and atomizing to droplets which are then cured to hardened beads with no or very low porosity and narrow size distribution by slurrying with aqueous ammonia. The cured beads are mixed with binders and the resulting pastes are compacted to green forms; the greens are sintered to fused silica-like objects at temperatures significantly lower than the melting of silica.

20 Claims, No Drawings

METHOD FOR MANUFACTURING AMORPHOUS SILICA OBJECTS

The present invention concerns the manufacturing of objects and articles of silica glass, i.e. amorphous silica, a type of silica which is normally formed by fusion of $SiO_2$ above about 1700° C.

Amorphous silica glass (fused silica) is a material with highly desirable properties such as a low thermal expansion factor, great thermal shock resistance, low ultrasonic absorption and high dielectric capacity. Moreover it is highly resistant to chemical attack at high temperature and can transmit optical signals with very little attenuation. It is therefore prized for making items for handling high temperature materials (e.g. metal smelting) and for making optical goods (e.g. spectrophotometric instruments, optical fibers, lenses, photomasks for circuit etching, etc.).

Casting fused silica obtained by melting highly pure quartz into useful shapes is well known but requires temperatures exceeding 1700° C., a temperature at which cracking and oxidation of the dies and moulds is rapid. Furthermore die deterioration makes it impractical to form articles with fine details and sharp definition. Hence, accurate forming of cast articles requires finishing by machining or grinding which is time consuming and expensive.

Because of the foregoing drawbacks, attempts have been made to form silica glass articles at temperatures below that of silica melting e.g. by the moulding and sintering of powdered or gelled porous silica bodies or by spraying on a rotating bait.

However, some problems may arise in connection with the tendency of amorphous silica to crystallize at temperatures below 1700° C. into isomeric forms with less desirable properties. Basically silicon dioxide can exist under the following forms which preferentially exist in the following temperature ranges: $\alpha$-quartz up to about 570° C.; $\beta$-quartz (570°-870° C.); tridymite (870°-1470° C.); $\beta$-cristobalite (1470°-1625° C.); amorphous silica (above 1700° C.). Now, a substantial amount of crystalline $\beta$-cristobalite in the fused silica is objectionable because it strongly reduces its resistance to thermal shock.

It was therefore desirable that the compaction and densification of greens obtained from powdered fused silica or gelled silica be carried out under conditions in which the formation of unwanted forms of silica in admixture with the amorphous silica be minimized as much as possible.

For instance U.S. Pat. No. 3,535,890 discloses making colloidal dispersions of silica spheres (10-20 mm) from alkali silicate solutions, evaporating the dispersion until a gel is formed, drying the gels and removing residual bound water by treatment with ammonium fluoride and chlorine, and finally sintering at temperatures of 1200°-1300° C.

U.S. Pat. No. 3,116,137 teaches crushing or grinding fused silica into a powder of 1-1000 $\mu$m particle size and sintering the powder between 1050° and 1450° C. under pressures in the range of 35 to 210 bar (500-3000 psi).

Sintering silica powders has the drawback of high shrinkage because of the relative low densities of the moulded greens. These low densities result from the use of irregularly shaped silica particles and wide size distribution.

In order to remedy this deficiency, Michael D. SACKS et al. (J. Am. Chem. Soc. 67(1984), 526-532) report making spherical hydrous silica particles with narrow size distribution by a hydrolysis/condensation technique involving adding tetraethyl-silicate (TEOS) to a stirred solution of ammonia in ethanol. By controlling the reactants concentrations, beads of about 0.2-0.6 $\mu$m were produced. The powders were washed, calcined at 200° C. and ultrasonically resuspended in water, whereby green bodies (disks) of relatively higher green density were ultimately formed by highly ordered sedimentation of said suspensions under gravitation. The greens were dried and sintered into translucent forms under isothermal conditions in the range 900°-1050° C. (ibid, 532-537).

A similar technique has been disclosed by T. Y. TSENG and J. J. YU (J. of Material Science 21 (1986) 3615-3624.

JP-A-57 205,334 also discloses making glass by sintering glass beads compacts. However in this case the glass is not silica but germanium doped silica. The beads are prepared by subjecting a solution of alkyl-silicate and alkyl-germanate to prehydrolysis to a sol-like phase, atomizing the sol and freeze-drying the atomized droplets into a powder under 0.0001 Torr at $-10°$ C.

Further references about fused silica current problems are given below:

G. W. SCHERER, "Sintering of low-density glasses", J. Am. Ceram. Soc., 60 (5-6), 1977, pp. 236-239. G. W. SCHERER et al., "Sintering of low-density glasses", J. Am. Ceram. Soc., 60 (5-6), 1977, pp. 239-243. G. W. SCHERER, "Sintering of low-density glasses III, Effect of a distribution of pore sizes", J. Am. Ceram. Soc., 60 (5-6), 1977, pp. 243-246. J. ZARZYCKI, "Gel$\rightarrow$glass transformation", J. Non-Cryst. Solids, 48, 1982, pp. 105-116. T. H. ELMER, "Sintering of porous glass", Ceram. Bull., 62 (4), 1983, pp. 513-516. G. M. TOMILOV et al., "Influence of the atmosphere in the sintering rate of vitreous $SiO_2$", Neorg. Mater., 14 (1), 1978, pp. 187-188. I. B. CUTLER, "Sintering of glass powders during constant rate of heating", J. Am. Ceram. Soc., 52 (1), 1969, pp. 14-17. M. N. RAHAMAN et al., "Creep and densification during sintering of glass powder compacts", J. Am. Ceram. Soc., 70 (10), 1987, pp. 766-774. A. G. EVANS et al., "Behaviour of large pores during sintering and hot isostatic pressing", J. Am. Ceram. Soc., 69 (6), 1986, pp. 444-448. W. STOEBER et al., "Controlled growth of monodisperse silica spheres in the micron size range", J. COLLOID and Interf. Sci., 26, 1968, pp. 62-69. S. C. DANFORTH et al., "Permeability of colloidal filtered (slip cast) monosized ceramic powder", Proc. Inter. Symp. on Ceramic Components for Engine, 1983, Hakone, Japan, pp. 729-738, Eds. Somiya, Kanai and Ando. G. C. WEI et al., "Synthesis of sinterable SiC powders by carbothermic reduction of gel-derived precursors and pyrolysis of polycarbosilane", Ceram. Bull., 63 (8), 1984, pp. 1054-1061. M. N. RAHAMAN et al., "Effect of rigid inclusions on the sintering of glass powder compacts", J. Am. Ceram. Soc., 70 (2), 1987, pp. C-348-C-351. R. CLASEN, "Preparation and sintering of high-density green bodies to high purity silica glasses", J. Non-Cryst. Solids, 89 (1987), pp. 335-344. C. A. M. MULDER et al., "Densification of $SiO_2$-xerogels to glass by Ostwald ripening", J. Non-Cryst. Solids, 82 (1986), pp. 92-96. P. P. BIHUNIAK, "Effect of trace impurities on densification of vitreous silica", Communic. Am. Ceram. Soc., October 1983, pp. C-

188-C-189. P. P. BIHUNIAK et al., "Effect of trace impurity levels on the viscosity of vitreous silica", Communic. Am. Ceram. Soc., August 1983, pp. C-134-C-135. K. PAPADOPOULOS et al., "Effect of heat treatment on the NA+ resistivity of vitreous silica", J. Am. Ceram. Soc., 66 (2), 1983, pp. 120-122. K. M. EISELE et al., "Stabilized fused-quartz tubes with reduced sodium diffusion for semi-conductor device technology", J. Electrochem. Soc., 125 (7), 1978, pp. 1188-1190. C. L. RATHMANN et al., "A new ultra-low-expansion, modified fused-silica glass", Applied Optics, 7 (5), 1968, pp. 819-823. T. VASILOS, "Hot pressing of fused silica", J. Am. Ceram. Soc., 43 (10), 1960, pp. 517-640. J. D. FLEMING, "Slip casting of fused silica", Ceram. Bull., 40 (12), 1961, pp. 748-750. G. J. McCARTHY et al., "Preliminary study of low-temperature "Glass" fabrication from non-crystalline silicas", J. Am. Ceram. Soc., 54 (12), 1971, pp. 637-638. J. ZARCYCKI et al., "Synthesis of glasses from gels: the problem of monolithic gels", J. Mat. Sci., 17 (1982), pp. 3371-3379. J. PHALIPPOU et al., "Behaviour of monolithic silica aerogels at temperature above 1000° C.", pp. 70-87, in "Ultrastructure processing of ceramics, glasses and composites", Eds. L. L. Hench and D. R. Ulrich, John Wiley and Sons N.Y., 1984. E. M. RABINOVICH et al., "Preparation of high-silica glasses from colloidal gels: 1, Preparation for sintering and properties of sintered glasses", J. Am. Ceram. Soc., 66, 1983, pp. 683-688. D. W. JOHNSON Jr. et al., "Preparation of high-silica glasses from colloidal gels: II, Sintering", J. Am. Ceram. Soc., 66, 1983, pp. 688-693. D. L. WOOD et al., "preparation of high-silica glasses from colloidal gels: III, Infrared spectrophotometric studies", J. Am. Ceram. Soc., 66, 1983, pp. 693-699. F. ORGAZ et al., "Vidrios de silice preparados por sinterizacion de particulas coloidales. Part. II: Cinética de sinterizacion", Bol. Soc. Esp. Ceram. Vidr., 26 (1987), 5, pp. 291-297. R. JABRA et al., "Synthesis of binary glass-forming oxide glasses by hot-pressing of gels", J. Non-Cryst. Solids, 42, 1980, pp. 489-498. M. DECOTTIGNIES et al., "Synthesis of glasses by hot-pressing of gels", J. Mat. Sci., 13, 1978, pp. 2605-2618. J. PHALIPPOU et al., "Crystallization of gels and glasses made from hot-pressed gels", J. Non-Cryst. Solids, 48, 1982, pp. 17-30. H. E. BERGNA, "Sinterizado a presion de oxidos coloidales refractarios", Industriay Quimica, Buenos Aires, 28 (3), 1970, pp. 123-127. M. PRASSAS et al., "Synthesis of monolithic silica gels by hypercritical solvent evacuation", J. Mat. Sci., 19, 1984, pp. 1656-1665. JP 87 62-176931, 1987, "Process of making silica glass". CA 915889; Dec. 5, 1972, "Forming method". U.S. Pat. No. 4,243,422; Jan. 6, 1981, "Granular quartz glass product". U.S. Pat. No. 4,059,658; Nov. 22, 1977, "Low temperature production of high purity fused silica". U.S. Pat. No. 4,098,595; July 4, 1978, "Process for the production of granular quartz glass". U.S. Pat. No. 4,054,641; Oct. 18, 1977, "Method for making vitreous silica". U.S. Pat. No. 4,042,361; Aug. 16, 1977, "Method of densifying metal oxides". U.S. Pat. No. 3,837,825; Sept. 24, 1974, "Process for forming transparent silica glass". U.S. Pat. No. 3,620,702; Nov. 16, 1971. Process improvement for manufacturing high-purity quartz forms". U.S. Pat. No. 3,775,077; Nov. 27, 1973, "Manufacture of vitreous silica bodies". M. SHIMIZU et al., "Reaction of $CCl_4$ with $SiO_2$ surfaces", J. Am. Ceram. Soc., 54 (5), 1971, pp. 271-272. J. B. PERI, "Infrared study of OH and $NH_2$ groups on the surface of a dry silica aerogel", J. Phys. Chem., 701 (9), 1966, pp. 2937-2945. E. FLAHERTY et al., "Reducing the effects of moisture in semiconductor gas systems", Solid State Technol., July 1987, pp. 69-75. D. L. WOOD et al., "Infrared studies of alkoxide gels", J. Non-Cryst. Solids, 82 (1986), pp. 171-176. R. K. ILER; page 639 in "The Chemistry of Silica: Solubility, Polymerization, Colloid and Surface Properties and Biochemistry", John Wiley and Sons, 1979. M. L. HAIR et al., "Chlorination of silica surfaces", J. Phys. Chem., 77 (17), 1973, pp. 89-94. T. H. ELMER, "Dehydroxylation of porous glass by means of chlorine", J. Am. Ceram. Soc., 64 (3), 1981, pp. 150-154. T. H. ELMER, "Dehydroxylation and nitriding of porous glass by means of water-soluble nitrogen-containing organic compounds", Glastech. Ber., 60 (1987), Nr. 12, pp. 399-405. E. N. BOULOS et al., "Water in glass: a review", J. Canadian Ceram. Soc., 41, 1972, pp. 83-90. J. P. WILLIAMS et al., "Direct determination of water in glass", Ceram. Bull., 55 (5), 1976, pp. 524-527. M. I. NIETO et al., "Determination of OH extinction coefficients in $R_2O\text{-}B_2O_3\text{-}SiO_2$ glasses (R=Li, Na, K)", J. Am. Ceram. Soc., 67 (4), 1984, pp. 242-244. K. SUSA et al., "Reduction of chlorine content in sol-gel derived silica glass", J. Non-Cryst. Solids, 79, 1986, pp. 165-176. E. M. RABINOVICH et al., "Elimination of $Cl_2$ and $H_2O$ in gel glasses", J. Non-Cryst. Solids, 82, 1986, pp. 42-49.

As said before, the efficiency of moulding green compacts from silica particles depends on particle size distribution and particle shape. In general the packing of spherical particles leads to better green densities than the packing of irregularly shaped particles. Another point which is important for lowering densification shrinkage during sintering is to use low porosity silica particles. The present inventor has developed a technique for making silica beads by atomization of a prehydrolyzed silicon alkoxide solution (precursor solution) which leads to very low or substantially negligible porosity and of narrow size distribution which strongly helps in the packing of greens of relatively higher density: this improvement and others to be discussed later permitted to design a novel method for making moulded objects and bodies of amorphous silica glass by the $SiO_2$ powder low shrinkage sintering technique. This method is summarized in annexed claim 1.

Basically, the method involves subjecting a solution of silicon alkoxide in aqueous alcohol to partial hydrolysis and precondensation into oligomeric polysiloxane and to distill off the water, alcohols and low molecular weight components, so that a gellable precursor solution is obtained. This solution, which may be of sizable viscosity, is then atomized under air or gas pressure to form a spray of droplets which is discharged into a liquid gelling phase in which gelling into hardened cured beads occurs. The cured beads then form the basis for moulding green forms which are finally densified into amorphous fused-like silica articles, the technique optionally including several variants and additional steps to be discussed hereafter.

The silicon alkoxides (alkyl-siloxanes) to be used in step (a) of claim 1 can be selected from one or more of lower alkoxy-silanes such as $Si(OMe)_4$, $Si(OEt)_4$, $Si(O\text{-}Prop)_4$, $Si(Oi.Prop)_4$ and other alkoxysilanes commonly available on the market; the methoxy- and ethoxy-silanes are preferably used since they are available in high purity grade at acceptable price.

The alkoxysilane compounds are first prehydrolyzed and converted into oligomeric precursors by mixing with an alcohol, preferably a lower alcohol such as ethanol or methanol, adding water and a catalyst such as HCl, and heating under controlled conditions. The weight ratio of alkoxysilane to lower alcohol is not critical and can vary from about 1:2 to 4:1, preferably 2:1 to 3:1. The amount of water expressed in terms of moles of $H_2O$ per mole of alkoxysilane can vary from about 0.05 to 1, preferably 0.1 to 0.8. The amount of catalyst can be very small, i.e. quantities in the order of $10^{-4}$–$10^{-2}$ mole of HCl per mole of alkoxysilane are effective. Prehydrolysis and oligomerization by polycondensation of the aforesaid mixtures can be effected by heating from about 40° to 80° C. for a few minutes to several hours. After oligomerization, the products of hydrolysis, the water and alcohol solvents are removed by distillation under ambient and/or reduced pressure, e.g. a few Torr to a few tens of Torr. The degree of prehydrolysis and oligomerization naturally increases with the amount of water present and also with the reaction time and temperature. This reflects on the viscosities of the final precursor solutions which increase in the same direction as the extent of oligomerization.

Table 1 below provides data which illustrate a few Examples of alkoxysilane prehydrolysis and formation of oligomer precursor solutions. In the experiments reported in Table 1, 500 g of alkoxy-silane (either Si(OEt)$_4$, TEOS, or Si(OMe)$_4$, TMOS) were mixed with 205 g of an alcohol (ethanol for the TEOS and methanol for the TMOS), 10 ml of 0.1N HCl in ethanol and variable amounts of water. Then the mixture was heated for ½ hr at 60° under reflux and thereafter distilled by raising the temperature gradually to 120° C. The distillate was collected and weighed. The results of Table 1 indicate that the weight of distillate increases with the water to alkoxysilane ratio which is expectable in view of an increasing extent of prehydrolysis and oligomerisation. In Table 1 the precursor solutions obtained are identified in function to the starting alkoxysilane, E for TEOS and M for TMOS samples.

TABLE 1

| Precursor solution | $H_2O$/alkoxy-silane (mole/mole) | Product weight (g) | Distillate weight (g) | Absolute viscosity (cP) |
| --- | --- | --- | --- | --- |
| E1b | 0.1 | — | — | — |
| E1 | 0.15 | 450 | 266 | 0.8721 |
| E2 | 0.45 | 405 | 328 | 1.4735 |
| E3 | 0.75 | 355 | 387 | — |
| M1a | 0.10 | 438 | 278 | 0.7743 |
| M1b | 0.11 | 444 | 235 | — |
| M1c | 0.15 | 431 | 289 | 0.8430 |
| M2 | 0.55 | 370 | 372 | 2.5688 |
| M2b | 0.50 | 385 | 355 | — |

The technique for spraying or atomizing the aforementioned precursor solutions is conventional and is similar to that of paint spraying. Any atomizer which can be adjusted to convert a slight viscous phase into microdroplets of a few nm to a few μm size under gas pressures of about 2 to 20 bar (0.2–2 MPa) is convenient.

Then the spray of microdroplets is discharged into an agitated aqueous phase in which the droplets will further hydrolyze and polymerize to hardened cured beads. Controlling the pre- and post- hydrolysis factors and the atomization parameters will help in controlling the size of the beads between about 0.1 and 5 μm. As said before, it is also important in this invention that the size distribution of the beads be narrow and that beads agglomeration be minimized. This can be best controlled by adjusting the spraying and post-hydrolysis parameters in order that the volume (or weight) ratio between the agitated curing solution (B) and the precursor solution (A) be kept from about 1:1 to 10:1, the concentrated ammonia (25% solution) content of B be between about 15 and 30% by weight and the water content of B be between about 5 and 50% by weight, the remaining component in B being a lower alcohol, preferably isopropanol. Generally, there is a tendency to formation of smaller beads 0.1–0.4 μm when the B/A ratio is increased.

Another factor is the control of the degree of hydrolysis of the precursor solution, being given that the more extensive this degree of prehydrolysis and oligomerization of the precursor, the smaller the size of the cured silica beads obtained. For instance, precursor E3 (see Table I) tends to give beads in the 200–250 nm range while precursor E1 tends to give larger beads (micron range). This effect is however also controlled by the B/A volume ratio whose increase (i.e. increase of dilution of the curing phase) will favor the formation of smaller beads.

Another factor is dilution of the precursor solution (for instance with ethanol or methanol) to obtain a spray with homogeneous droplet distribution. Generally, before spraying, the precursor can be diluted with 0.25 to 3 parts by volume of alcohol solvent, a dilution of about 1:1 being preferred.

Another factor which contributes to improve the final densification behaviour to a homogeneous bubble free silica glass is the low degree of porosity of the beads. For obtaining beads of low or negligible porosity, spraying and curing of the droplets should preferably be carried out at relatively low temperature, i.e. ambient temperature or not exceeding 40°–50° C. Also, the agitation of the B phase (hardening solution) should be regular and sufficiently rapid to ensure fast dispersion of the droplets in the curing medium. Stirring velocities of 200–400 rpm in 2–6 l beakers are preferred.

Table 2 below summarizes some experimental data relative to the formation of beads with lower alkoxysilane precursors by atomization according to the invention. The precursors are those listed in Table 1. They were first diluted (solutions A) with a given quantity of a lower alcohol (ethanol for the E precursor and methanol for the M precursors) to give a 50% solution. Spraying was effected with a Monarch R-45-40 atomizer (from Monarch, Philadelphia) which can atomize about 1 liter of solution/hr under about 10 bar within a spray angle of about 45°. Atomization was carried out at room temperature within a tube in which the pressure was maintained below atmospheric (0.5–0.8 bar) to avoid clogging problems. Lower outside pressures (down to about 0.1 bar) are also possible. Solution B (hardening phase) was spun at 300–500 rpm. The distance between the nozzle of the spray apparatus and the hardener liquid B was about 4–8 cm. This can however be varied outside the given limits. Table 2 also gives the ratio of solution B relative to solution A as well as the respective components, i.e. successively, water, isopropanol and 25% aqueous ammonia, in %.

After discharging the spray of A into B was completed, the slurry was heated to 70° C. for about 1 hr and partially evaporated to promote concentration. Evaporation can preferably be done under reduced pressure (20–40 Torr) in a rotavapor apparatus. For examining the resulting silica beads morphology under the microscope, samples of the concentrated slurries were dried and sputter-coated with gold.

In Table 2, the average bead size is given as measured; a low value indicates very narrow bead size distribution; a range value indicates wider size distribution.

To more specifically illustrate the interpretation of the data of Table 2, the cured beads identified by a1 are obtained as follows:

150 g of precursor E3 are diluted with 150 g of ethanol solvent to provide a 50% solution. This solution is sprayed into about 5 volumes (or weight) of solution B (1500 g ≃1500 ml) composed of 40% $H_2O$ (600 ml), 40% isopropanol (600 ml) and 20% of concentrated aqueous ammonia (300 ml of 25% ammonia). Then the resulting slurry was treated as mentioned above.

TABLE 2

| Cured beads | Solution A Precursor (g) | B/A | Solution B (% $H_2O$, | iPrOH, | $NH_4OH$) | Average bead size (μm) |
|---|---|---|---|---|---|---|
| a1 | E3 (150) | 5 | 40 | 40 | 20 | 0.25 |
| a2 | E3 (150) | 5 | 40 | 35 | 25 | <0.25 |
| a4 | E1 (150) | 1.5 | 40 | 40 | 20 | 0.7 |
| a5 | E3 (150) | 1.5 | 40 | 40 | 20 | 0.2 |
| a6 | TEOS (150) | 1.5 | 40 | 40 | 20 | 0.5 |
| a7 | E3 (150) | 5 | 40 | 40 | 20 | 0.22 |
| a8 | E1 (210) | 1.8 | 40 | 40 | 20 | 0.32–0.6 |
| a9E1 | E1 (150) | 1.5 | 10 | 65 | 25 | 1.1 |
| a9E2 | E2 (150) | 1.5 | 10 | 65 | 25 | 0.24 |
| a9E3 | E3 (150) | 1.5 | 10 | 65 | 25 | 0.15 |
| a10 | E1 (150) | 1.5 | 10 | 65 | 25 | 0.4–0.6 |
| a12 | E1 (150) | 1.5 | 10 | 65 | 25 | 0.3–0.7 |
| a13 | E1b (150) | 1.5 | 10 | 65 | 25 | 1.0–1.1 |
| a3 | M2 (150) | 5 | 40 | 40 | 20 | 0.25 |
| a11 | M1b (150) | 1.5 | 10 | 65 | 25 | 0.44–0.73 |
| a14 | M1b (150) | 1.5 | 10 | 65 | 25 | 0.35–0.8 |
| a15 | M1b (140) | 1.6 | 40 | 40 | 20 | 0.2–0.4 |
| a16 | M1a (140) | 1.6 | 10 | 65 | 25 | 0.65–0.9 |
| a17 | M1a (140) | 1.6 | 10 | 65 | 25 | 0.4–1.1 |
| a18 | M2 (195) | 4 | 40 | 40 | 20 | 0.2–0.4 |
| a19 | M1a (280) | 1.6 | 10 | 65 | 25 | 0.35–0.7 |
| a20 | M2b (200) | 4 | 40 | 40 | 20 | 0.2–0.3 |

Notes:
The amount of EtOH in a8 is 90 g to give a 70% by weight solution of precursor.
Sample a6 is a control with non-prehydrolysed TEOS. Solution B of a5 contained 0.2% of a surfactant (Tween-20).
Samples a1, a3, a7, a9E1 and a20 have a particularly narrow and homogeneous size distribution.
Sample a6 gave poor results (many agglomerates, wide distribution).

For separating the beads from the aqueous curing medium in which they are in slurry form, many techniques can be used including filtration, draining, freeze-drying and hypercritical drying. Hypercritical drying means heating the slurry under pressure conditions exceeding the critical values of the liquids to be removed whereby the interfacial liquid/solid energy constraints disappear and the volatile compounds trapped within the beads structure can escape without exerting mechanical disrupting efforts on this structure.

For effecting a freeze-drying (fd) separation, one can proceed as follows: The slurry to be treated is washed by sedimentation and decantation with pure water and then the resulting slurry is frozen at liquid nitrogen or acetone-solid $CO_2$ solution temperature and subjected to vacuum evaporation with conventional means (rotavapor) until all solvent is evaporated. Well disagglomerated silica particles were obtained by freeze-drying (fd).

Hypercritical drying is preferably effected with slurries in which the original aqueous phase has been removed and replaced by sedimentation/decantation with an alcohol such as ethanol. Then, a vessel with the slurry therein is placed in an autoclave and the pressure is raised to about 50 bar with $N_2$ at room temperature. The autoclave is then heated slowly (0.5°–2° C. per hr) to 280° (exceeding the critical temperature Tc) whereby the pressure increases to about 140 bar (exceeding the critical pressure Pc). Then after 1 hr, the autoclave is slowly decompressed, still at 280° C. (about 15–80 bar/hr), down to 5 bar, after which it is cooled to room temperature.

Table 3 summarizes the data of a few typical hypercritical drying operations for some of the slurries identified in Table 2 in terms of heating rate (°C./hr), maximal pressure at 280° C. and decompression rate (bar/hr). In Table 3, the samples are identified by the bead number and a hypercritical drying step (Hyp) number.

TABLE 3

| Run No. | Heating rate | max. Pressure (bar) | decompression rate |
|---|---|---|---|
| a11Hyp1 | 1.2 | 140 | 15–20 |
| a11Hyp2 | 2 | 150 | 33 |
| a14Hyp3 | 1.7 | 200 | 50 |
| a13Hyp4 | 1.8 | 150 | 58 |
| a14Hyp5 | 2.7 | 150 | 72.5 |
| a16Hyp6 | 2.3 | 170 | 73 |
| a17Hyp7 | 2.3 | 185 | 34 |
| a19Hyp10 | 1.7 | 175 | 55 |
| a20Hyp11 | 1.4 | 180 | 58 |
| a20Hyp12 | 1.2 | 205 | 45 |

Notes:
in a14Hyp5 the initial pressure was 60 bar and in a20Hyp12 it was 70 bar.

Measures of the specific surface area (by usual means) of the beads after hypercritical drying showed very little or substantially no porosity. For instance a20Hyp11 beads (very narrow size distribution, about 0.2 μm) had a measured surface area of 8 m²/g which is very near the theoretical outside surface value.

It should be noted at this stage that the complete drying of the beads in this invention is not a must with respect to converting the beads to a paste and moulding this paste into green bodies as specified in step c) and d) of annexed claim 1. In some embodiments the powders in slurry form were simply washed by sedimentation/decantation with alcohol and drained under suction. Then the moist powders were used directly for casting after admixing with moulding aids such as binders or plasticizers.

For converting the powders of silica obtained in the present invention into green forms by moulding or casting, moulding aids such as binders and/or plasticizers and fluidizing solvents are admixed thereto. Very often a same additive functions simultaneously as binder and plasticizer; therefore, the term of binder will be used exclusively hereafter.

Fluidizing solvents are preferably chlorinated organic solvents like chloroform, trichlorethylene (TCE), trichloropropylene and the like but other organic fluidizing solvents can also be used like acetone and alcohols like EtOH, i.PropOH, n-BuOH, etc.

Preferred binders are those commonly used in the moulding of ceramic bodies and include camphor (5–150% b.w.) polyvinylbutyral (PVB) polyethylene glycol (PEG) in quantities of 1 to 5%. Other binders of manufacturer's proprietary formulae are also useful according to methods of the ceramic industry.

Binders based on hydrolytically gelled alkoxysilanes can also be used advantageously. For instance a gelled $SiO_2$ binder (A1) can be prepared by mixing TMOS (3,8 g) with water (0.9 g) methanol (1 g) and 1.1N alcoholic ammonia (0.5 g) and allowing the mixture to set after which the gel is ground in a mortar to give a free flowing powder. The amount of gelled $SiO_2$ binder can advantageously be 5–25% b.w. of the $SiO_2$ beads.

Another approach to improve the affinity (i.e. the binding effect) between $SiO_2$ grains when moulding objects and articles is to effect silanation (silanization) of the beads with a silane or silazane coupling agent. Silanation of minerals is well known in the dental industry (see for instance D. E. WALLER, U.S. Pat. No. 3,709,866). In the present invention silanation is preferably effected by boiling the dried beads (freeze-dried or hypercritically dried) in a toluene solution of a silane. The preferred silane is 3-glycidyloxypropyltrimethoxysilane (GMS). Table 4 summarizes a few examples of silanation by giving the weight and grade of $SiO_2$ beads used (see Table 2) and the drying mode, (fd=freeze-dried; Hyp=hypercritical drying) as well as the amount of GMS and toluene solvent. The refluxing time was 4 to 6 hrs. After silanation, the beads were drained on a filter, washed with acetone and dried in a muffle oven in dry air.

TABLE 4

| Silanated beads | | $SiO_2$ beads | | Solvent | GMS |
| --- | --- | --- | --- | --- | --- |
| (code); | yield (g) | grade; | weight (g) | (ml) | (g) |
| m1 | (4.6) | a1fd | (5) | 100 | 1 |
| m3 | (29) | a2fd | (30) | 500 | 6 |
| m4 | — | a4fd | (35) | 500 | 7 |
| m5 | — | a4fd | (21) | 250 | 3 (+3 g TMOS) |
| m6 | (31) | a3fd | (39) | 250 | 7.7 |
| m7 | (18) | a5fd | (22) | 250 | 5 |
| m8 | (14) | a6fd | (21) | 250 | 5 |
| m9 | (30) | a8fd | (32) | 500 | 7.5 |
| m10 | (34) | a9E1fd | (35) | 300 | 9 |
| m11 | — | a8fd | (30) | 300 | 9 |
| m12 | (30) | a10fd | (35) | 300 | 9 |
| m13 | — | a11Hyp2 | (34) | 250 | 9 |
| m14 | (52) | a14fd | (61) | 400 | 21 |
| m15 | (36) | a13Hyp4 | (37) | 320 | 15 |
| m16 | (54) | a15fd | (60) | 400 | 25 |
| m20 | (11) | a20Hyp11 | (—) | 200 | 3.8 |
| m21 | (12.5) | a18Hyp8 | (13) | 200 | 5 |
| m22 | (13) | a16Hyp6 | (13) | 200 | 5 |
| m23 | (13) | a21Hyp12 | (13) | 200 | 5 |

In order that the $SiO_2$ powder made in this invention be formed into heat densifiable green forms, isostatic (I) or axial (A) pressing of powders containing binder additives can be performed.

Alternatively, wet powders or pastes can be wet pressed according to techniques in which the moistening liquids are expelled from the castings during pressing.

The application of isostatic or axial pressing of dry pulverulent $SiO_2$ bead composition is conventional here and follows usual means with inherent disadvantages such as shrinkage and accuracy requirements in the weighing of the powder portions. Usually binders and solvents are blended with the dry powder and the resulting paste is spread over a surface and muffle dried. Then the dry mixture is sieved on a 50–200 μm mesh grid depending on the case. Axial pressing was limited to simple form (disks); it was carried out by placing the composition between two pistons in a stainless-steel cylinder and pressing at room or elevated temperature. Isostatic pressing was carried out in silicone rubber moulds which themselves were fabricated by casting monomers into aluminum moulds and curing.

Table 5 below summarizes a few experimental data relative to axial (A) and isostatic (I) pressing of silanated (m) powders (see Table 4). The forms were in the shape of blocks or disks 1–5 cm wide and 0.1–1.5 cm thick.

TABLE 5

| Green identification code | Binders (%) | Pressure (bar) | Time (sec) | Temperature (°C.) |
| --- | --- | --- | --- | --- |
| S3 (A) m3 | PVB (2); PEG (0.5) | 72 | 15 | 80 |
| S4 (A) m4 | PVB (2); PEG (0.5) | 150 | 15 | 20 |
| S3 (I) 5m3 | camphor (12) | 150 | 15 | 20 |
| S3 (I) m3 | PVB (2); PEG (0.5) | 150 | 15 | 20 |
| S4 (I) m4 | PVB (2); PEG (0.5) | 175 | 15 | 20 |
| S9 (I) m9 | PVB (4); PEG (1) | 175 | 15 | 20 |

The wet pressing technique is actually preferred in the present invention for making green forms as it permits easier control of the green shape and better definition of geometrical parameters during densification. According to this technique a wet powder or paste containing solvents and binders is pressed in a piston-pressing assembly, means being provided to ensure elimination of the liquids during pressing. Such means may consist of porous materials (e.g. plates of porous magnesia or alumina) inserted between the powder and the pressing piston having sufficient absorbing capacity to withdraw the liquids from the cake subjected to pressure and sufficient stiffness not to deform under the pressure. Otherwise, such means consist in providing passages between the piston and the cylinder which enable evacuation of the liquids while filtration means (filter pads) assist in retaining the grains of the powder in the space subjected to pressure. According to an example of this technique, two pistons sliding in a cylinder are used. A filter paper is placed on top of the bottom piston and the powder slurry with binders is placed over it. Then the slurry layer is capped with a plastic foil and the laminate is pressed with the top piston.

Examples of preparation of green bodies by the wet pressing technique are listed below with the following data: experiment identification code; nature of the beads used (a code for non-silanated beads, see Table 2, m code for silanated beads, see Table 4), drying conditions if any, fd for freeze dried, Hyp for hypercritical drying with reference to Table 3; when moist beads resulting from sedimentation/decantation and draining are used, this is so indicated by the alcohol used and other solvents used successively for washing; weight of the beads; nature and quantity of binders and solvents; conditions of pressing.

Su2: m15 (9 g); tetrachlorethylene (TCE) 43 g; S-160 plastifier from AMSCO, Union Oil Co. of California
(1 g); B7 binder, a 30% b.w. acrylic resin in methyl-ethyl-ketone (MEK) of Rohm & Haas Co, 1200 cP at 25° C. (2.53 g). The ingredients were blended together and the blend partially dried to paste consistency. The paste was placed over a plate of porous MgO and covered with a plastic foil (pf). The assembly was pressed with a piston under about 0.07 bar and, still under pressure, heated overnight at 70° C. The green was then removed from the cylinder.

Sv1: m14 (10 g); TCE (38 g); B7 binder (2.7 g); S-160 plastifier (1 g).
Operations as for Su2 except for using an $Al_2O_3$ porous plate, pressure 12 bar, 68° C.; 16 hrs. A well cast disk 5 cm wide and 0.8 cm thick was obtained.

Sr1: a2fd (12 g); TCE (25 g); S-160 (1 g); B7 (2.7 g); cast and pressed as for Sv1.

Sq1: a6 (EtOH) (7 g); TCE (20 g); S-160 (0.5 g); B7 (2 g); MGO porous plate; cast as Sv1.

Sf: a9E2 (EtOH/acetone/TCE) (43.4 g); A1 binder as defined in penultimate paragraph before Table 4.

The moist powder was placed on top of a lower piston protected by three filter paper layers, then it was coated with a plastic foil. Pressing was effected with the upper piston at room temperature, 72 bar, 6 min; during pressing, the liquid from the paste leaked out between the piston and cylinder walls but the particles were retained by the protective covers. Demoulding furnished a well formed plate which was then dried overnight at 80° C.

Sq: m6 (10 g); TCE(30 g); A-1 (twice the amount for Sf); cast as for Sf.

Sm13: like Sg but using m13 beads

SB3: a14Hyp3 (12 g) was first boiled 6 hrs with B(O-Me)$_3$ in 100 ml of toluene; then it was washed with acetone and dried at 80° C.

This product is labelled SB3 powder. Independently, a binder mixture was prepared by mixing 20 g of PVB (M$_w$ 38,000) with 60 g TCE, 30 g n-BuOH and 30 g EtOH; this solution was denoted PVB/S*. The preparation of the SB3 green form was carried out as follows: SB3 powder (12 g); TCE (35 g); PVB/S* (3.93 g); PEG (Mw 2000)(0.14 g). Casting operations were carried out as for Sv1.

Sw2: a17Hyp7 (10 g); TMOS (7.6 g); MeOH (11 g); H$_2$O (1.8 g); 1.1N ammonia in ethanol (1 g).

The mixture was allowed to gel, it was crushed into a powder and the powder was moulded in a rectangular mould as for Sf between two pistons using filter papers and plastic foil; 3 Ton, 6 min.

Sw3: like for Sw2 except that the crushed gel was dried (90° C.) for 16 hrs before pressing.

Sw5: like for Sv2 except that the mould was circular and that the green was further compacted by isostatic pressing (I.p.) as explained in the paragraph before Table 4.

Sg2: like Sw5 except that m16 was used instead of a17.

Si2: like Sw5 except for replacement of a17 by a19-Hyp9.

Sx1: a20 (MeOH/acetone); TMOS (6.5 g); MeOH (6 g); H$_2$O (1.5 g). After gelling at 62° C. (1.5 min), it was ground to a powder and pressed as described for Sw2.

Sx3: m20 (10.83 g); TCE (31.5 g); PVB(38K)/S* (3.4 g) PEG (2K) (0.12 g). After homogeneizing the blend (60°, 2 min), this was pressed using the two pistons system with one pf on top and 3 fp on bottom; 4 Ton, 6 min.

Sx4: a20Hyp2 (12 g); TCE (36 g); PVB/S* (3.54 g); same casting method as for Sx3.

Sa12i: a12fd (19 g): PVB (38K) (1.5 g); PEG 2000 (0.5 g); pressing isostatically at 2000 bar, breaking and crushing the pressed block and pressing the powder again under 2000 bar.

In order to densify the foregoing green bodies to amorphous fused silica, thermal treatments are needed which include drying the green forms, decompose the binders, dehydroxylate the glass and finally sinter the mass to a homogeneous translucent or transparent SiO$_2$ glass.

In general, drying and destroying the binders by evaporation requires temperatures up to about 1000°–1100° C. using a heating rate of about 1°–5° C./min under an oxidizing atmosphere, usually air, oxygen, chlorine or mixture of these gases with helium or argon. Other halogen compounds in vapor form such as $CCl_4$, HF, $SiF_4$, $BF_3$ can also be used. These gases also contribute to dehydroxylation of the glass.

Full densification by sintering under ambient pressure requires temperatures in the range of about 1200°–1500° C., while hot pressing requires about 1100°–1250° C. under 100–300 bar, preferably 200 bar.

Finally, the sintered or hot pressed articles can also be subjected to a short induction heating period in order to achieve glass purification and improve transparency, i.e. decrease the attenuation factor for U.V. transmission. Induction heating involves temperatures of 1750°–1800° C. for a period of a few min to 1 hr approximately.

Table 6 summarizes some of the heat treatment (H) (sintering included or not included) used in the present invention.

The data are reported as follows: since the heating conditions (heating rate, composition of the atmosphere) may vary depending on the temperature, these variations are indicated in the table together with the conditions. For instance the data concerning H5 are interpreted as heating from room temperature to 610° C. at the rate of 1° C./min under a 80/20 (v/v) O$_2$/He atmosphere and keeping at 610° C. for 11.5 hrs under the same atmosphere; then heating to 1005° C. for 1.5° C./min under a 9/50 (v/v) Cl$_2$/He atmosphere; then maintaining for 3 hrs under helium and then cooling at a rate of 4° C./min under helium. In Table 6, fr means "furnace rate", i.e. the power to the furnace is simply cut off.

TABLE 6

| Heat treatment identification | Heating or cooling rate (°C./min) | Temperature (°C.) | Time (hr) | Atmosphere composition (ml/min) |
|---|---|---|---|---|
| H5 | 1 | 610 | 11.5 | O$_2$80/He20 |
|  | 1.5 | 1005 | 0 | Cl$_2$9/He150 |
|  | — | 1005 | 3 | He150 |
|  | 4 | 20 | — | He20 |
| H9 | 1.3 | 610 | 2 | O$_2$30/He80 |
|  | 2 | 1005 | 0 | Cl$_2$9/He150 |
|  | — | 1005 | 3 | He150 |

TABLE 6-continued

| Heat treatment identification | Heating or cooling rate (°C./min) | Temperature (°C.) | Time (hr) | Atmosphere composition (ml/min) |
|---|---|---|---|---|
| | 2 | 20 | — | He20 |
| H10 | 1 | 602 | 7 | $O_2 30$/He80 |
| | 2 | 1000 | 0 | $Cl_2 9$/He150 |
| | — | 1000 | 3 | He80 |
| | 2 | 20 | — | He20 |
| H11 | 1 | 610 | 5.5 | $O_2 30$/He80 |
| | 2 | 1005 | 0 | $Cl_2 25$/He150 |
| | — | 1005 | 3 | He150 |
| | 2 | 20 | — | He20 |
| H12 | 1 | 610 | 6 | $O_2 30$/He80 |
| | 2.5 | 1015 | 0 | $Cl_2 25$/He150 |
| | — | 1015 | 3 | He150 |
| | 15 | 20 | — | He20 |
| H13 | 4 | 1015 | 1 | $O_2 30$/He80 |
| | 4 | 20 | — | $O_2 30$/He80 |
| H19 | 0.8 | 610 | 5 | $O_2 30$ |
| | 2.6 | 1070 | 0 | $Cl_2 25$/He150 |
| | — | 1070 | 3 | $O_2 5$/He150 |
| | fr | 20 | — | He20 |
| H21 | 7 | 1170 | 2 | He100 |
| | 7 | 1327 | 1 | He100 |
| | fr | 20 | — | He/$O_2$ |
| H22 | 5 | 1170 | 2 | He100 |
| | 5 | 1341 | 0.6 | He100 |
| | fr | 20 | — | He/$O_2$ |
| H25 | 0.8 | 610 | 6 | $O_2 30$ |
| | 2.6 | 1070 | 0 | $Cl_2 25$/He150 |
| | — | 1070 | 3 | $O_2 5$/He150 |
| H28 | 6 | 1162 | 0.5 | He80 |
| | 7 | 1327 | 0.6 | He80 |
| | fr | 20 | — | He |
| H30 | 5 | 1120 | 3 | He80 |
| | 6 | 1310 | 1 | He80 |
| | fr | 20 | — | He80 |
| H33 | 5 | 1170 | 2 | He80 |
| | 6 | 1320 | 0.8 | — |
| | fr | 20 | — | — |
| H35 | 7 | 600 | 0 | $O_2 30$/He40 |
| | 3.5 | 1070 | 0 | $Cl_2 25$/He150 |
| | 3.5 | 1170 | 2 | $O_2 5$/He150 |
| | 5 | 1300 | 0.8 | $O_2 5$/He150 |
| | fr | 20 | — | He |
| H40 | 5 | 1170 | 2 | He80 |
| | 5 | 1320 | 0.8 | He80 |
| | fr | 20 | — | He80 |
| H44 | 5 | 1170 | 0.5 | He |
| | 3 | 1410 | 1 | He |
| | fr | 20 | — | He |
| H45 | 5 | 600 | 0 | He80 |
| | — | 600 | 1.5 | He80/$CCl_4$ |
| | 5 | 702 | 0 | He80/$CCl_4$ |
| | 5 | 1170 | 1 | He80 |
| | 3 | 1410 | 1 | He80 |
| | fr | 20 | — | He80 |
| H51 | 5 | 600 | 0 | He80 |
| | — | 600 | 1.5 | He80/$CCl_4$ |
| | 5 | 1170 | 2 | He80 |
| | — | 1170 | 0.5 | He80/$CCl_4$ |
| | 6 | 1475 | 0.5 | He100 |
| | fr | 20 | — | He |
| H52 | 5 | 500 | 0 | He80 |
| | 5 | 600 | 1 | He80/$CCl_4$ |
| | 5 | 700 | 0 | He80/$CCl_4$ |
| | 5 | 1170 | 2 | He80 |
| | — | 1170 | 0.75 | He80/$CCl_4$ |
| | 7 | 1450 | 30 | He80/$CCl_4$ |
| | fr | 20 | — | He |

In Table 7, we report the properties of the sintered bodies subjected to the treatment defined in Table 6 in terms of transparency or transulcency. It should be noted that when the treatment involved use of halogens or halogenated compounds, improved transmission in the UV range was experienced.

TABLE 7

| Green form | Preliminary heat treatment Temp. (°C.) | Preliminary heat treatment Time (hr) | Atm. | Main heat treatment | Results |
|---|---|---|---|---|---|
| Ss2 | — | — | — | H19, H21 | Almost Clear |
| S31 | — | — | — | H11, H22 | Translucent |
| S9I | — | — | — | H12, H22 | Translucent |
| S12I | — | — | — | H19, H22 | Translucent |
| S4A | — | — | — | H11, H22 | Translucent |
| S12I | — | — | — | H19, H28 | Translucent |
| Sa12I | — | — | — | H25, H28 | Translucent |
| Sq1 | 600 | 6 | $O_2$ | H30 | Almost clear |
| Sv1 | 600 | 6 | $O_2$ | H30 | Translucent |
| Sr1 | 600 | 6 | $O_2$ | H30 | Translucent |
| SB3 | 600 | 6 | $O_2$ | H33 | Almost clear |
| Sf | 600 | 6 | $O_2$ | H35 | Translucent |
| Sf | — | — | — | H39 | Translucent |
| Sw3 | — | — | — | H43, H44 | Dense, translucent |
| Sf | — | — | — | H42, H44 | Dense, translucent |
| Sg2* | 700 | 6 | $O_2$ | H51 | Well densified |
| Sx3* | 700 | 6 | $O_2$ | H52 | Clear |
| Sx4* | 700 | 6 | $O_2$ | H54 | |

*These forms were also isostatically pressed for further consolidation before heat treatment.

As said before, alternative or supplemental heat treatments involved using hot-pressing (hp) techniques. For this, a Degussa hot-press fitted with graphite heating elements and capable to accept up to 500 kg load was used. The moulds were of high purity graphite. Broadly, the treatments involved degassing under vacuum while heating up to 200° C., then filling with argon and heating to 900° C., applying pressure and then heating at a given temperature for a period of time. Table 8 below summarizes the data concerning the most important experiments. Heating and cooling rates were either 10° or 11.7° C./min.

TABLE 8

| hp Experiment | Heating rate (°C./min) | Pressure (bar) | Temperature (°C.) | Time of treatment (min) |
|---|---|---|---|---|
| hp2a | 10 | 175 | 1050 | 24 |
| hp2b | 10 | 175 | 1100 | 30 |
| hp4 | 11.7 | 127 | 1100 | 6 |
| | | 143 | 1100 | 4 |
| | | 169 | 1100 | 4 |
| | | 175 | 1100 | 10 |
| hp7a | 11.7 | 143 | 1100 | 0 |
| | | 175 | 1100 | 31 |
| hp7b | 11.7 | 159 | 1300 | 12 (He) |
| hp8 | 11.7 | 159 | 1200 | 2 |
| hp9 | 11.7 | 159 | 1200 | 2 |

Table 9 below reports the results of the hot-pressing experiments applied to samples subjected beforehand to heat treatments involving or not involving pressureless sintering (see Table 6).

TABLE 9

| No. | Green Sample | Heat Treatment | hp Treatment | Results |
|---|---|---|---|---|
| 1. | S31 | H5 | hp2a | Clear glass |
| 2. | S31 | H5 | hp2b | Clear glass |
| 3. | S4A | H10 | hp3 | Insufficient |
| 4. | S4I | H9 | hp4 | Good glass |
| 5. | S9I | H12 | hp7a; hp7b | Perfectly clear |
| 6. | S9I | H12; H13 | hp8 | Good silica glass |
| 7. | m12 | $CCl_4$ dried | hp9 | Clear glass |

The last experiment reported in Table 9 indicate that it was possible to directly hot-press into forms powders not compacted to greens beforehand. In this case, the powder (m12) was first heated for 12 hrs at 525° C. under $O_2$. Then for 1.5 hrs under a flow of He impregnated with $CCl_4$ vapors by bubbling through liquid $CCl_4$ at 25° C. Similar results were noted with other powders and other gases such as $Cl_2$, $SiF_4$.

In other embodiments, partly densified bodies (i.e. greens subjected beforehand to H treatments) were dehydroxylated with halogen containing gases at 600°–1000° C. and thereafter hot-pressed.

Nos 4–6 in Table 9 showed excellent transmission in IR, visible and UV ranges (80–90% transmission at $\lambda=2$–$2.5$ μm; 60–70% at $\lambda=0.3$ μm).

As said before, the aforementioned densification treatments can be supplemented by an induction heating treatment (HF).

For this, an EMA-KG (Germany) apparatus, type HGTU3/50, fitted with an FGH P-400 programmer and using a W/Re thermocouple was convenient.

The container and susceptor were made of graphite and the samples were separated by flat graphite disks spacers with a thin graphite foil between the samples.

The HF heating conditions were to first heat the sample to 600°–800° C. and then raise the temperature very quickly (about 30° C./min) up to maximal temperature; then, to subject the sample to very fast cooling (about 100° C./min) to ambient temperature. Some data and results are collected in Table 10 below. In the Table, the first column refers to the pressed green and to the heat treatment applied to said green (see Table 6); then the second column indicates the HF peak temperature and the length of time at which this temperature is maintained. The last column refers to results.

TABLE 10

| Sample + H treatment | HF heating Temp. (°C.) | Time (min) | Results |
| --- | --- | --- | --- |
| S4I, H9 | 1400 | 90 | Translucent glass |
| S9I, H11 | 1750 | 10 | Clear glass (flowed) |
| S9I, H11 | 1750 | 2 | Clear glass (bubbles) |
| Sa12I, H23, H24 | 1750 (He) | 5 | Partly glassified |
| Sa12I, HF17 | 1750 (He) | 10 | Glass (bubbles) |
| Sm13, H23, H41 | 1750 (He) | 10 | Glass (bubbles) |
| Sw2, H46 | 1800 (He) | 60 | Glass (no bubbles) |
| Sw5, H48 | 1800 (He) | 60 | Glass (no bubbles) d = 2.24 |
| S12, H47 | 1800 (He) | 21 | Clear glass (no bubbles) |

The clear glasses obtained by HF treatment also had excellent optical transmission properties.

I claim:

1. A method for manufacturing moulded bodies of amorphous silica under non-melt-collapsing conditions, this method comprising the steps of:
   a) subjecting one or more alkoxysilanes to prehydrolysis by means of water and catalysts whereby oligomeric siloxane precursors solutions are formed;
   b) converting said oligomer precursor solution into a spray of fine droplets by atomizing with a nozzle under gas pressure and discharging this spray into a stirred aqueous medium in which the polymerization of said siloxane oligomers will continue due to further hydrolysis therein and self-condensation, whereby the droplets will turn into hardened, cured polysiloxane beads or grains in the form of a slurry in said aqueous medium;
   c) separating said beads from at least most of said aqueous medium and forming them into a paste by blending with binder, plastifier and fluidizing solvent;
   d) casting or moulding said paste under pressure into shaped green substrate forms, most of the fluidizing solvents being squeezed out by the pressure;
   e) drying the forms and subjecting to heat to destory and to evaporate volatile or decomposable components still present therein;
   f) sinter the heat-treated form at temperatures substantially below the melting of $SiO_2$, whereby densification to a non-porous silica structure occurs, thus substantially avoiding possible substrate deformation due to fusion during sintering.

2. The method of claim 1, in step a) of which said alkoxy-silanes are selected from $Si(OEt)_4$ and $Si(OMe)_4$ monomers which are prehydrolysed in acidified aqueous lower alcohols and, after oligomerization, the solutions are subsequently evaporated to remove volatile components.

3. The method of claim 1, in which the absolute viscosity of the precursor solution is from about 0.5 to 5 mPas.

4. The method of claim 1, in which atomization of the precursor solution is effected under about 5 to 20 bar and the spray is delivered into air kept under 0.1 to 0.8 bar.

5. The method of claim 1, in which said stirred medium of step b) comprises water, a lower alcohol and ammonia.

6. The method of claim 1, in which atomization parameters are adjusted to provide beads of a diameter comprised between about 100 nm and 5 μm.

7. The method of claim 1, in which step b) is performed at ambient temperature, whereby the polysiloxane beads are substantially not porous.

8. The method of claim 1, in which the separation in step c) is effected by freeze-drying, hypercritical drying or by decanting, syphoning off said aqueous medium, suspending the beads in a volatile water compatible solvent and draining on a filter.

9. The method of claim 1, in which the binders and plasticizers are selected from one or more of camphor, polyvinylbutyral, polyvinyl alcohol, polyalkylene glycols and hydrolytically gelled alkoxy-silanes.

10. The method of claim 1, in which the fluidizing solvent of step c) is a chlorinated organic solvent.

11. The method of claim 1, in which, prior to step d), the beads are surfaced with a silane or silazane coupling agent.

12. The method of claim 1, in which step d) is effected by placing the paste of beads, binder, plastifier and solvent in a cylinder provided with pistons and subjecting it to axial compression of 50–300 bar.

13. The method of claim 12, in which filtration means are interposed between said paste and said pistons, and in which passage means are provided between said pistons and said cylinder to assure evacuation of liquids squeezed out of said paste during compression.

14. The method of claim 1, in which the green forms resulting from step d) are pressed isostatically to increase the degree of compactness.

15. The method of claim 14, in which for pressing isostatically, the forms are embedded in a pouch of butyl rubber.

16. The method of claim 1, in which step e) is performed by heating to about 1100° C. in air, oxygen or other gases at a rate of about 1°-5° C./min.

17. The method of claim 1, in which step f) is effected by atmospheric isothermal sintering at temperature of 1200°-1500° C. for 0.5 to 6 hrs.

18. The method of claim 1, in which step f) is effected by hot pressing at temperatures of 1100° to 1250° under pressure of about 200 bar.

19. The method of claim 1, involving, as an additional step, a short induction heating period to improve transparency.

20. The method of claim 1, involving, as an additional step, heating the dried forms in the presence of halogen or halogen compounds to increase the degree of dehydroxylation and glass purity.

* * * * *